United States Patent Office 3,019,292
Patented Jan. 30, 1962

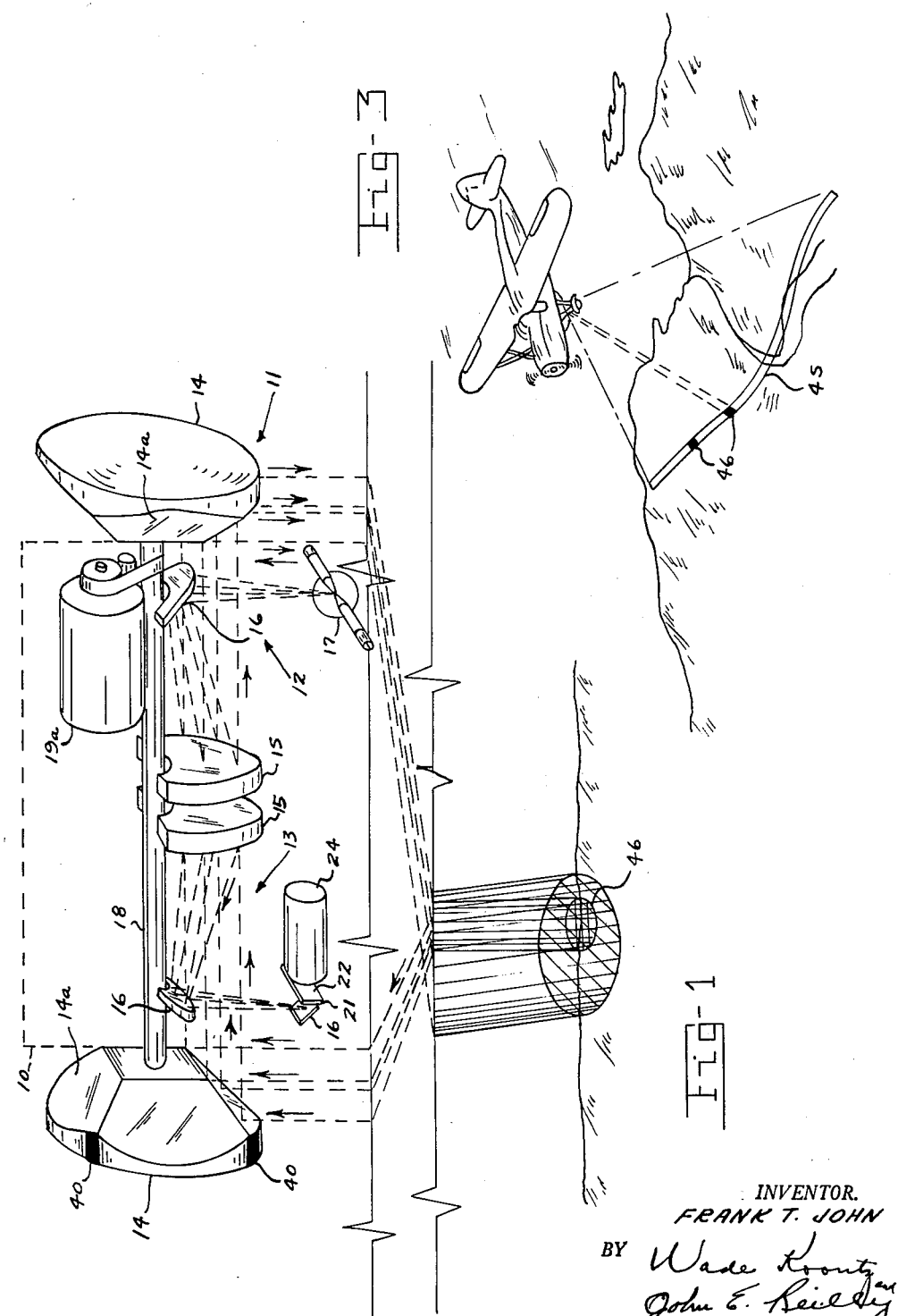

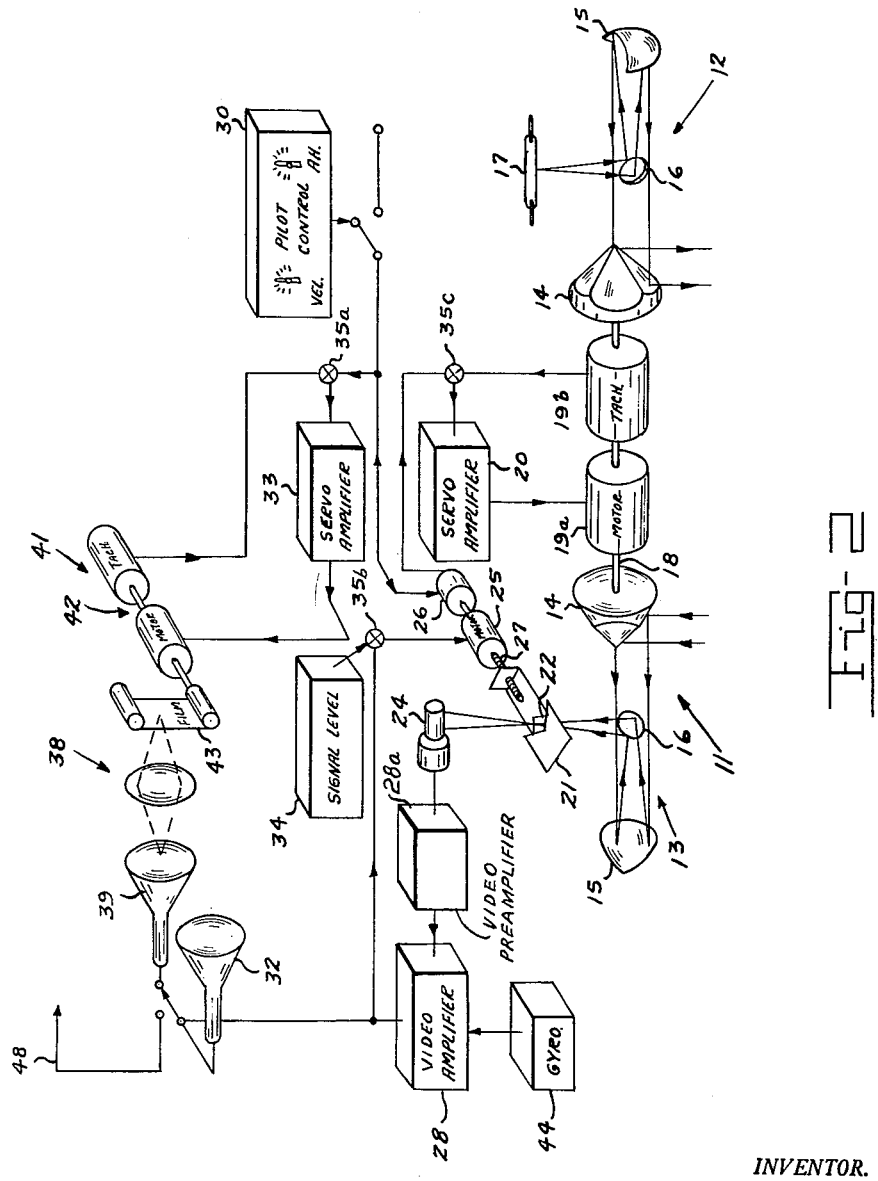

3,019,292
SELF-ILLUMINATED AERIAL CAMERA
Frank Thomas John, State College, Pa., assignor to the United States of America as represented by the Secretary of the Air Force
Filed Nov. 16, 1956, Ser. No. 622
7 Claims. (Cl. 178—6.7)
(Granted under Title 35, U.S. Code (1952), sec. 266)

The present invention relates to an improved photographic system for producing electronically strip pictures of the terrain passing beneath the aircraft in which it is mounted for recording and instantaneous transmission to a ground station, and more particuarly, to an aerial camera mount having a synchronized illuminator apparatus to permit simultaneous illumination and viewing of a succession of elementary areas on the ground.

In aerial photography, obscured terrain conditions, particularly those encountered in night flying operations, often present conditions under which natural illumination is insufficient to translate objects of limited visibility into well defined images for photographic purposes.

It is common to provide a bank of high intensity flood lamps selectively positioned on the aircraft to illuminate the general area to be photographed. Also, flash bombs are commonly used in aerial photography; however, power requirements are high in that the ordinary camera is viewing an entire landscape and consequently the light source used must completely illuminate the entire area. In more specialized types of photography, such as the type described in the patent issued to George L. Haller, Patent Number 2,709,716, issued May 31, 1955, wherein light is admitted from only a limited increment of the terrain at any one time, it would only be necessary to illuminate each small area to be photographed provided that the illumination source could be accurately synchronized with the viewing unit for simultaneous illumination. In accomplishing such a proposal, it is clear that power requirements could be substantially reduced and also the light source could be concentrated into a narrow, high intensity beam for illumination of each area.

It is therefore a consequent and primary object of the present invention to provide an improved version of the contrast enhancing aerial camera of the above noted patent and to combine therewith a novel scanning system consisting of an illuminating optical system and receiving optical system coupled together to simultaneously illuminate and view each elementary area on the ground, the "elementary area" referring to each small region on the ground from which light is accepted at any instant.

It is another object to provide an aerial photographic device manually or automatically controllable in operation while maintaining maximum efficiency over a wide range of flying conditions, and in which low power requirements are necessary for the illumination and recording of the terrain to be photographed.

It is another object to provide a servo control system to permit automatic or manual synchronized adjustment of the film speed, scan rate, and angular resolution of the aerial photography device in proportion to variations in velocity, altitude and the size of the elementary area on the ground to be photographed.

It is another object to provide a self-illuminated aerial camera in which the object itself, rather than the image, is scanned by means of a reflective optical system so constructed and arranged as to permit acceptance by the camera of those rays very close to, or along, the optical axis.

It is another object to provide a scanning mirror formed of a plurality of rotating mirror surfaces so as to increase the scan rate factor of the scanning device to thereby permit operation at increased aircraft speeds.

It is another object to provide a self-illuminated aerial camera in which the light accepted is converted into an electronic signal capable of being transmitted to a ground receiving station for instantaneous film recording.

It is a further object to provide a self-illuminated aerial camera capable of scanning at high aircraft speeds a ground strip perpendicular to the direction of flight in which the scan rate and film speed are responsive to velocity and altitude changes to thereby equate the operation of the scanner and film printer to the resolvable element to be scanned on the ground.

It is still a further object to provide a high sensitivity, self-illuminated aerial camera having an optical system adaptable for construction in relatively large sizes and use under limited light conditions in which reflective optics are utilized throughout for light viewing in the spectrum between ultraviolet and infrared.

In accordance with the preceding objects and purposes as hereinbefore set forth the present invention includes as its basic components a scanning device comprised of illuminating and light receiving reflective optical systems forming substantially parallel light paths to simultaneously illuminate and scan successive elementary areas along the ground, the term "light" as used herein including radiation in the spectrum between ultraviolet and infrared, together with a phototube or suitable electromagnetic radiation detector to translate the light received by the scanning device from each elementary area into a video signal, the video signal being amplified and generated as a single horizontal trace by a cathode ray tube for recording on a film printer unit. A transmitter unit is also included to receive the amplified video signals for transmission to a ground recording station, and a pilot control chassis is interconnected by the film printer unit and scanning device to correlate the film speed, scan rate and angular resolution with the velocity, altitude and elementary area to be scanned.

Reference is now made to the accompanying drawings wherein like reference numbers designate similar parts and in which:

FIG. 1 is a somewhat perspective view schematically showing the optical arrangement of the synchronous illuminator;

FIG. 2 is a block diagram of the servo system for operation and control of the self-illuminated camera; and FIG. 3 is a perspective view illustrating the scanning by a self-illuminated aerial camera of a ground strip penpendicular to the direction of flight of the camera aircraft.

Referring more particularly to the drawings, there is shown in FIGS. 1 and 2 a camera body 10 within which is mounted a scanning device 11 made up of two identical optical systems 12 and 13. Optical system 12 may be referred to as the illuminating optical system and optical system 13 as the light receiving or viewing optical system. Each system is disposed in mirrored, axially aligned relation to one another, and includes a rotational scanner mirror 14, a parabolic objective lens 15 and light path folding mirrors 16. Mirror surfaces 14a are formed out of each scanner mirror 14 so as to define a four-sided pyramidal-shaped mirror in which the surfaces are disposed at 90° to each other and at a 45° angle to the longitudinal axis of the scanner mirrors. Each parabolic objective lens 15 is stationed along the light path of the scanner mirror to control the direction and span of the light reflected, and also to properly focus the light, the light folding mirrors 16 also aiding in controlling the deflection of light in the optical systems. Positioned directly beneath the folding mirror 16 of the illuminating optical system 12 is a high intensity mercury arc lamp 17 which directs a narrow, high intensity beam through the mirror system as shown for reflection on the ground area. Proper focusing of the high intensity light source on the ground plane is accomplished by means of the lens 15 which uniformly directs and impinges the light onto each mirror surface rotating through the optical axis. Each mirror then reflects the light downwardly over a predetermined strip of terrain. Each mirror surface 14a on one scanner mirror is aligned with a corresponding mirror surface on the other scanner mirror to sweep through coincident angles of reflection during each scan.

In addition, the camera body houses other components. A drive shaft 18 which couples the scanning and illuminating mirrors 14 in axial alignment is rotatably driven by a scanner drive motor 19a and tachometer 19b. Also a preamplifier 20 in the scanner speed servo system is connected into the motor 19a as shown in FIG. 2. Other components which are not shown but are included in the camera body are blowers for the motor and the lamp, and a rectifier-filter system operating from the aircraft 400 cycle supply which supplies D.-C. at 70 volts and 15 amperes to the lamp. In the lower left section of the camera body an adjustable field stop 21 which is placed on the optical axis and at the focus of the objective lens 15 of the receiving optical system 13, is provided with a variable pinhole 22 to determine the size and shape of the ground area from which light will be collected at any instant to impinge on a multiplier phototube or suitable detector 24 positioned behind the field stop. Drive motor 25 and a precision dividing potentiometer 26 are geared to the field stop mechanism by means of a lead screw 27 to provide resistance values proportional to the field stop size. Also mounted in the lower left section of the camera body but not shown are a video preamplifier 28a for the tube, an additional preamplifier for the extra gain required when a lead sulfide detector is used for infared photography, and a lead sulfide detector and its mounting.

Referring to FIG. 1 and FIG. 2, it will be seen that, the optical system is particularly suited for use with infrared radiation, since all of the optical elements are of the reflective type which are characterized by very little absorption of radiation in the infrared range. Refractive type optics would absorb too large a percentage of the received light for practical application in the infrared range. When the system is adjusted to operate in the infrared range, the mercury arc lamp 17 may be used or alternately an illumination source which is particularly rich in infrared may be used. The detector 24 may be a lead sulfide cell or similar device suitable for infrared detection. For greater signal-to-noise ratio the detector may be refrigerated by any of several means known to the art. The low temperature operation of the detector reduces the noise which is thermally generated within the detector. The refrigeration elements are not shown in the figures. The infrared spectrum as received back from the ground is found to have peaks in amplitude or intensity in certain narrow ranges due principally to the characteristics of the illumination source 17. Detectors of infrared radiation have peaks in sensitivity in narrow bands of the spectrum. It is desirable to match the detector to the illumination source characteristics such that the detector has a range of maximum sensitivity corresponding to the range of maximum output of the source illumination.

The light received by the optical system 13 for impingement onto the multiplier phototube or suitable detector 24 is converted into a video signal and, after preamplification in the camera unit, is sent to a main video amplifier 28 in the control chassis schematic shown in FIG. 2. The control chassis is preset by means of a pilot's control panel 30 on which are grouped the operating controls for the camera unit, including signal strength, gamma and level, together with aircraft altitude and velocity potentiometers which affect the film and scanner speeds. At the bottom of the control panel are toggle switches controlling main power, illuminator power, film drive off-on and field stop servo off-on. The control chassis itself thus contains all normal operating controls for the system, including those necessary for the operation of a small cathode ray monitor scope 32 which gives an "A" type presentation of the video signal, sweep and blanking circuits (not shown) and the amplifier 20 and magnetic amplifier unit 33 of the scanner and film speed control servos, respectively. Also shown in the servo control circuit are a signal level control box 34 to inject signals into the field stop drive motor 25, and subtraction circuits 35a, 35b and 35c whose output signals are equal to the difference between the two input signals, as illustrated by the direction of the arrows in FIG. 2.

The amplified video signal from the control chassis is next fed to a film printer unit. Here the signal is used to intensity modulate a single-line trace on a high definition cathode ray tube 39. The trace on the tube 39 is varied in synchronism with the scanning of the camera optical scanning mirrors 14 by means of a deflection control circuit connected between the optical system and the cathode ray tube defleciton plate (not shown). This deflection circuit is made up of sync pulse magnets 40 shown on the left hand scanning mirror in FIG. 1 which induce synchronizing pulses in two stationary magnetic pickup heads (not shown) mounted on the camera body in close proximity to the path of the magnets. The angular positions of the pickup heads are such that a pulse is generated in one at the start, and in the other at the end, of each scan. The pulses are sharpened in appropriate networks and used to drive a flip-flop circuit which operates the sweep and video blanking circuits into the cathode ray tube. Each synchronized trace is then recorded as a continuous raster on a film recorder 41 such as a Fairchild Oscillo-Record camera which includes a 400 cycle servo motor drive-tachometer combination 42 which is driven in turn by the magnetic amplifier unit 33 to move the film 43 slowly in the vertical direction. The recording film 43 is driven at a speed directly proportional to the velocity to altitude ratio, as determined by the settings of the velocity and altitude potentiometers in the control panel. In addition to the components of the film printer unit which are shown, the unit also contains hermetically sealed high voltage supplies for the cathode ray tube, an automatic speed-size control circuit which keeps the recording speed size proportional to the size of the field stop in the camera unit, and a circuit which allows high voltages to be applied to the cathode ray tube only when a sweep is present.

The power supply for the camera unit (not shown) applies to the system a regulated voltage supply for bias purposes, and additional voltage regulated for the direct viewing cathode ray tube 39. The latter voltage is also divided in suitable resistance networks to supply the small monitor scopes 32 and the multiplier phototube 24. The power supply unit also contains the power section of the servo amplifier which controls the scanner speeds, the scanner speed amplifier in turn controlling a conventional amplidyne (not shown) which supplies control power to the scanner motor 19. An additional controlling unit provided is a vertical gyro 44 with potentiometer pick-offs whereby stabilization of the camera unit is attained by connecting the gyro pots so as to vary the trace centering on both the recording and direct viewing scopes as the aircraft rolls and pitches.

The camera unit should be installed so as to be as nearly level as possible in flight and with the scanner shaft 18 parallel to the longitudinal axis of the aircraft. The camera may be mounted with either optical system 12 or 13 forward.

Aerial photography operations are commenced in flight by closing the appropriate switches to initiate operation of the film printer unit and scanning device. Scanning is then accomplished by each of the four corresponding mirror surfaces of the illuminating and receiving scanner mirrors 14 which are rotated through successive angles of 90° by the scanner drive motor 19a. As each of the corresponding mirror surfaces are rotated through a 90° scan angle traversing the optical axes they will simultaneously illuminate and view a series of elementary areas 46 forming each strip 45, as shown in FIG. 3. At the beginning and end of each scan a certain period of dead time will occur due to the placement of masks between each of the mirror surfaces in order to block stray light paths. This dead time is related to the film printer unit by the sync pulse magnets mounted on the scanner mirrors to the film printer unit and used for retrace and video clamping purposes to synchronize the movement of the trace across the film recorder with the movement of the scanner mirrors.

The movement of the scanner mirrors through succeeding angles of 90° is also synchronized with the speed of the aircraft so that a series of slightly overlapping strips will be illuminated and viewed in the direction of flight. Also, since the light paths formed by the optical systems are essentially parallel, a greater area must be illuminated than is viewed to cause sufficient overlapping on each elementary area to insure adequate reception by the light receiving scanner mirror as in FIG. 1. High sensitivity is thus achieved due to the accurate, simultaneous illumination of each elementary area viewed by the receiving scanner mirror; also, since the camera is viewing a very small elementary area at any instant, the illumination system must illuminate but a very small area at any time. This means that power requirements are much smaller in this system than for ordinary photography, and a more concentrated light source can be directed onto each area photographed.

The optical system design further lends itself to construction in relatively large sizes with very little correction in the optical systems, since the field stop size can be utilized to determine the amount of light gathered at any instant, and also only those rays very close to, or along, the optical axis are of interest. Of course, the off-axis rays are the most difficult to correct for distortion; therefore in scanning the object, rather than the image and positioning the adjustable field stop at the focus and on the axis of the optical system 13, the optical system need be corrected only for substantially on-axis aberrations.

As each illuminated area is focused onto the field stop, a video signal is thereby obtained at the output of the multiplier phototube 24 for amplification and recording by the film printer unit 41. The horizontal sweep of the trace generated by the cathode ray tube is of course intensity modulated by the video signal and synchronized with the scanning of the optical system by means of the servo control deflection circuit. A facsimile or VHF transmitter 48 is also connected into the video amplifier portion to feed the amplified signal to a ground recording station, as described in Patent Number 2,709,716, issued May 31, 1955. Also, the monitor scope 32 permits general checking of the trace generated to permit correction of the control chassis variations in flight.

In order that the camera be reasonably automatic in operation while maintaining maximum efficiency over a wide range of flight conditions and illumination levels it is necessary to control three basic quantities by means of the control chassis. These are film speed, scan rate, and field stop size which controls the angular resolution. The speed of the film 43 is made proportional to the velocity of the aircraft divided by the altitude by developing a signal in the pilot's control system 30 which is proportional to the velocity to altitude ratio and transmitting it into the subtraction circuit 35a leading into the servo amplifier 33. A return signal from the motor-tachometer 42 is also fed into the same subtraction circuit 35a and the corrected output signal is relayed through the amplifier 33 and into the motor tachometer 42 to drive the recording film.

The field stop size is controlled in operation by an output signal from another subtraction circuit 35b which receives a preset input signal from the signal level control 34 and the return signal from video amplifier 28. This corrected output signal from the subtraction circuit 35b into the motor 34 will correct the field stop size in inverse proportion to the signal strength, and hence the amount of light entering the phototube 24.

The scan rate must be controlled so that the number of scans per second will not be less than the velocity, in feet per second, divided by the size of the elementary area to be viewed on the ground, if no part of the terrain is to be overlooked. Since the elementary area to be viewed is proportional to the field stop size times the altitude of the aircraft, the number of scans per second are made proportional to the velocity divided by the field stop size times the altitude. The voltage proportional to this quantity is obtained by transmitting the existing velocity to altitude signal from the pilot's control box into the potentiometer 26 where the signal is divided by the field stop size. The signal leaving the potentiometer 26 is then relayed into the subtraction circuit 35c for the amplifier 20 together with the return signal from the tachometer 19b, and the corrected signal is then fed to the servo amplifier 20 and into the motor 19a to control the operation of the scanner drive. In this manner, each velocity to altitude signal from the pilot's control can be utilized in the control of both the film printer unit and scanning system to cause the desired synchronous operation of the two systems in relation to external conditions.

In the present invention, other modifications and alterations of the structure have been disclosed herein for purposes of illustration which will be apparent to those skilled in the art, and it is clear that the same may be employed without departing from the spirit and scope of the invention as defined in the following claims.

What is claimed is:

1. A scanner apparatus for use in an aerial camera for the simultaneous illumination and viewing of a succession of transverse strips of terrain passing beneath the aircraft, comprising an illuminating optical system and a light receiving optical system, each illuminating optical system and light receiving optical system having an inclined flat rotating scanner mirror disposed on an axis coincident with the optical axis of each optical system and substantially parallel to the longitudinal axis of the aircraft; a high intensity light source to transmit a beam through said illuminating optical system to progressively illuminate transverse strips of each area of ground to be viewed, said illuminating optical system having means to control the direction and span of the beam onto the illuminating inclined scanner mirror for concentrated, predetermined reflection to the ground; an adjustable field stop placed on the optical axis and at the focus of the light receiving optical system, said light receiving optical system having means to control the direction and span of the light path from the light receiving scanner mirror to the adjustable field stop; and drive means to rotate said scanner mirrors whereby said scanner mirrors will simultaneously illuminate and view each strip of terrain, said rotating scanner mirrors each comprising a plurality of corresponding mirrored surfaces defining a pyramidal-shaped scanner mirror, the corresponding mirror surface of each of said rotating pyramidal-shaped scanner mirror rotating at an angle of substantially 45° with respect to the longitudinal axis of the aircraft to establish substantially parallel light paths to the ground for simultaneously illuminating and viewing each area of the ground to be recorded by the aerial camera transversely to the longitudinal axis of the aircraft.

2. A scanner apparatus for use in an aerial camera for the simultaneous illumination and viewing of a succession of transverse strips of terrain passing beneath the aircraft, comprising an illuminating optical system and a light receiving optical system, each illuminating optical system and light receiving optical system having an inclined flat rotating scanner mirror disposed on an axis coincident with the optical axis of each optical system and substantially parallel to the longitudinal axis of the aircraft; a high intensity light source to transmit a beam through said illuminating optical system to progressively illuminate transverse strips of each area of ground to be viewed, said illuminating optical system having means to control the direction and span of the beam onto the illuminating inclined scanner mirror for concentrated, predetermined reflection to the ground; an adjustable field stop placed on the optical axis and at the focus of the light receiving optical system, said light receiving optical system having means to control the direction and span of the light path from the light receiving scanner mirror to the adjustable field stop; and drive means to rotate said scanner mirrors whereby said scanner mirrors will simultaneously illuminate and view each strip of terrain, said rotating scanner mirrors each comprising a plurality of corresponding mirrored surfaces defining a pyramidal-shaped scanner mirror, the corresponding mirror surface of each of said rotating pyramidal-shaped scanner mirror rotating at an angle of substantially 45° with respect to the longitudinal axis of the aircraft to establish substantially parallel light paths to the ground for simultaneously illuminating and viewing each area of the ground to be recorded by the aerial camera transversely to the longitudinal axis of the aircraft, said pyramidal-shaped scanning mirrors being coupled to said drive means in axially aligned, oppositely facing relation for synchronous illumination and viewing of a succession of predetermined elementary strip areas on the ground transverse to the longitudinal axis of the aircraft.

3. A scanner apparatus for use in an aerial camera comprising: two identical reflective optical systems constituting an illuminating optical system and a light receiving optical system disposed in mirrored, axially aligned relation to one another, each having a pyramidal-shaped scanner mirror rotating about a common axis parallel to the longitudinal axis of the aircraft, the corresponding mirror surfaces forming the sides of each scanner mirror being aligned to simultaneously sweep a substantially identical strip of ground perpendicular to the direction of flight, and parabolic objectives and light path folding mirrors placed in the light paths of said optical systems to control the direction and span of light passing therethrough; a light source to direct a high intensity beam through said illuminating optical system for reflection by the scanner mirror onto a succession of predetermined elementary areas forming each strip of ground, the scanner mirror of said light receiving optical system simultaneously scanning each elementary area illuminated to collect the light therefrom; an adjustable field stop placed on the optical axis and at the focus of the light receiving optical system to determine the size and shape of light to be collected from each elementary area scanned for recording by the camera; and drive means including a drive shaft coupling said scanner mirrors together for synchronous rotation thereon.

4. In an aerial camera for producing electronically, strip pictures of the terrain passing beneath the aircraft, a scanner apparatus to simultaneously illuminate and view each elemental area on the ground, said scanning apparatus comprised of: illuminating and receiving optical systems establishing substantially parallel light paths from the aerial camera to the ground, each optical system having a rotating substantially 45° scanning mirror disposed on an axis coincident with the optical axis and parallel to the longitudinal axis of the aircraft so as to sweep a strip of ground perpendicular to the direction of flight, a parabolic objective, and a light path folding mirror; a high intensity light source directed through said illuminating optical system to selectively illuminate each areal strip; an adjustable field stop placed on the optical axis and at the focus of said receiving optical system so as to determine the size and shape of the elemental area on ground from which light is collected; light-sensitive means to convert the light passing through said adjustable field stop into an electronic signal for recording by said camera; and means to rotate said scanning mirrors for simultaneously and progressively scanning a succession of areal strips of predetermined extent as the aircraft passes over the terrain.

5. The aerial camera according to claim 4 in which said rotating substantially 45° scanning mirror in each optical system is further characterized by a plurality of mirrored surfaces disposed at a substantially 45° angle to the optical axis as each surface is rotated into the light path between said parabolic objectives and the ground whereby the scan rate with respect to the speed of rotation of said scanning mirrors is increased to permit operation at high aircraft speeds.

6. An aerial camera for producing electronically strip pictures of the terrain passing beneath the aircraft comprising: a synchronous illuminator apparatus having rotating illuminating and receiving scanner mirrors disposed about an axis coincident with the optical axis and parallel to the longitudinal axis of the aircraft, means to rotate said scanning mirrors through coincident angles of reflection with respect to the ground, a high intensity light source to impinge light on said illuminating scanner mirror for reflection on a succession of areal strips perpendicular to the direction of flight, focusing means to focus light reflected from the said receiving scanner mirror by each elementary area illuminated on the ground, an adjustable field stop having an adjustable aperture positioned on the optical axis at the focus of said focusing means to receive light from said focus means, a field stop drive mechanism to regulate the amount of light passing through said adjustable aperture, and light sensitive means to convert the light passing through said adjustable aperture into a video signal; a film printer unit including a light-emissive tube responsive to the video signal, means to record the trace generated by said light-emissive tube to correspond with the scanning pattern of said rotating scanner mirrors; and a gyro stabilized servo system to stabilize said film printer unit under turbulent flight conditions; and a servo control system including a power source to develop a voltage proportional to the velocity to altitude ratio of the aircraft, means interconnecting said power source and said record means to operate said record means at a rate dependent on the velocity to altitude ratio, means interconnecting said power source and said rotating means including a dividing potentiometer connected to said field stop drive mechanism to regulate the rotation of said scanning mirrors at a rate proportional to the velocity to altitude field stop size ratio, the field stop size being controlled by the power source voltage supplied through said dividing potentiometer and field stop drive mechanism whereby a series of areal strips perpendicular to the direction of flight are synchronously illuminated, photographed, and recorded to produce a continuous picture of the terrain traversed by the aircraft.

7. An aerial camera to produce electronically strip pictures of the terrain passing beneath the aircraft for instantaneous recording and transmission to a ground receiving station, comprising the combination of: first and second reflective optical systems, each including an inclined rotating scanning flat mirror in axially aligned, oppositely facing relation to simultaneously transversely sweep a succession of predetermined elementary ground areas along each ground strip to be photographed as the mirrors are simultaneously rotated; a high intensity light source associated with said first optical system, said first optical system further including means to converge said high intensity light source on one of said rotating scanning mirrors for reflection by said one scanning mirror onto each elementary ground area, said second optical system including means to receive the light from the said elemental ground area received from the first optical system to focus the light reflected from the second of said rotating scanning mirrors, a field stop having an adjustable pinhole disposed at the focus of said second optical system to regulate the amount of light passing therethrough, and video signal generating means to receive the light passing through said pinhole and to develop a video signal proportional to the light received; a video amplifier for said video signal generating means; a video signal recording station including a viewing indicator to visually monitor the amplified video signals and means to transmit the latter signals to a ground recording station; a video signal receiver having a cathode ray tube connected in parallel relation with said viewing indicator to convert the amplified video signals into an electron beam scanning the screen of said tube, a film recorder disposed in front of said cathode ray tube to print said scanning beam including a deflection circuit to regulate the sweep of each scanning beam across said film recorder to correspond with the movement of said scanner mirrors; a gyro stabilized servo system to control the reflection of each scanning beam; and pilot control means including a power supply to operate said aerial camera whereby said scanning mirrors, field stop and film recorder are synchronously regulated to correspond with variations in velocity and altitude of the aircraft.

References Cited in the file of this patent

UNITED STATES PATENTS

| | | |
|---|---|---|
| 2,216,716 | Withem | Oct. 1, 1940 |
| 2,424,193 | Rost | July 15, 1947 |
| 2,526,682 | Mulberger | Oct. 24, 1950 |
| 2,580,324 | Schwarz | Dec. 25, 1951 |
| 2,672,798 | Snyder | Mar. 23, 1954 |